C. E. PHILLIPS.
LAWN MOWER ATTACHMENT.
APPLICATION FILED AUG. 18, 1916.
1,206,465.
Patented Nov. 28, 1916.
2 SHEETS—SHEET 1.
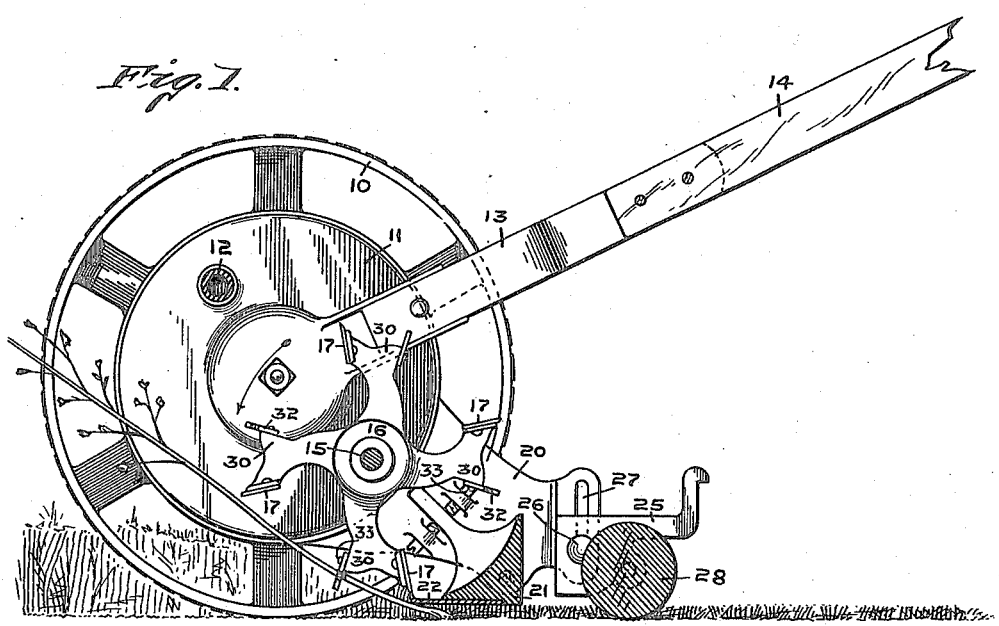
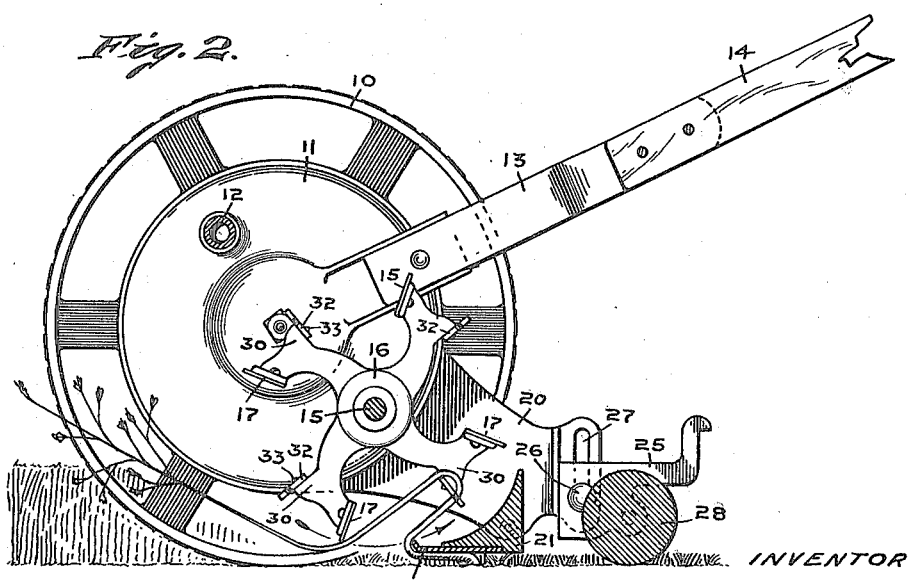

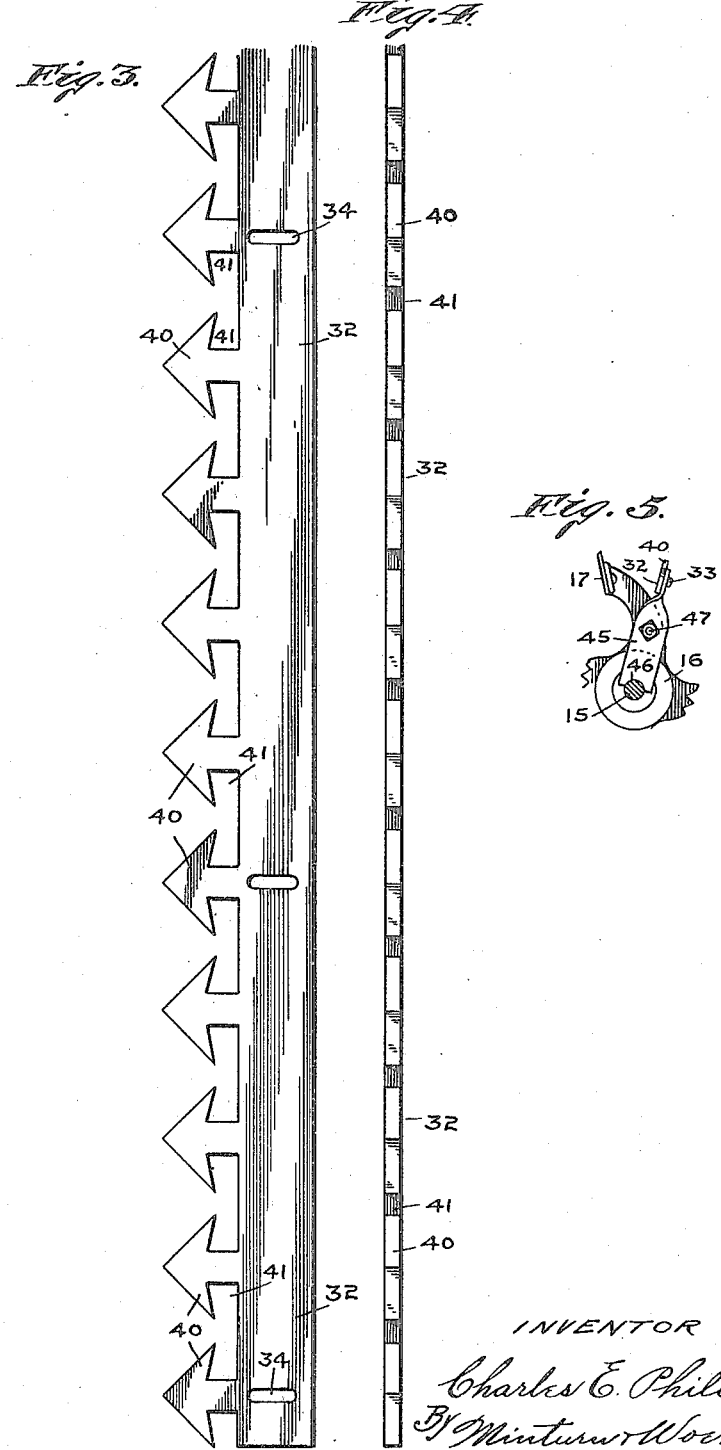

UNITED STATES PATENT OFFICE.

CHARLES E. PHILLIPS, OF INDIANAPOLIS, INDIANA.

LAWN-MOWER ATTACHMENT.

1,206,465.  Specification of Letters Patent.  Patented Nov. 28, 1916.

Application filed August 18, 1916. Serial No. 115,674.

*To all whom it may concern:*

Be it known that I, CHARLES E. PHILLIPS, a citizen of the United States, residing at Indianapolis, in the county of Marion and State of Indiana, have invented certain new and useful Improvements in Lawn-Mower Attachments, of which the following is a specification.

It is practically impossible to rid lawns of rank prodigious weeds after attaining certain height, or of that class of weeds to which the plantain belongs, which lies closely to the ground, by means of any conventional style of lawn mower at present upon the market, for the reason that in the first instance the weeds are too tall to allow the cutting blades of the mower to pass over them, while in the latter case the weeds so hug the surface of the ground as to escape the cutting edges of the mower blades.

The present invention relates to a certain device to be attached to any of the lawn mowers for the removal of all rank weeds from the lawn at the same time the usual cutting of the grass proceeds; and the object of the invention consists in the provision of a device of the above character whereby rank weeds are picked up and elevated into a position to enable the cutting edges of the mower blades to clip them in close proximity to the surface of the ground.

I accomplish the above object, and such others as may appear from a perusal of the specification and claims, by means of the construction illustrated in the accompanying drawings forming a part hereof, in which—

Figure 1 is a cross section of a conventional style of lawn mower, showing my invention in operative position in its initial engagement with a weed. Fig. 2 is a view similar to Fig. 1, except that the reel of the mower has moved to a slightly advanced position, showing my invention in an advanced stage of operation upon the weed. Fig. 3 is a fragmentary detail view in side elevation of one of the devices, on a considerably enlarged scale. Fig. 4 is an edge view of the construction shown in Fig. 3. Fig. 5 is a fragmentary detail cross section of a mower reel, showing the means for attaching my invention to a mower already in use.

Referring to the drawings, 10 represents one of the traction wheels of an ordinary lawn mower, and 11 the stationary shell of the housing for inclosing the gearing through which power is transmitted from wheel 10 to the reel of the mower.

12 represents a tie-rod for securing the ends of the stationary mower structure, and 13 the bow for securing the operating handle 14.

15 represents the reel shaft and 16 the spiders carried by shaft 15 for supporting the cutting blades 17.

The stationary frame of the mower is provided at each end with an integral arm 20 to which a bar 21 is secured, and bar 21 forms a bearing for attaching stationary cutter blade 22. Arms 20 also provide means for attaching members 25 which are adjustably secured by means of the bolts 26 and slots 27, the members 25 providing a bearing for roller 28. The adjustability of members 25 permits the latter to be raised and lowered with respect to roller 28 and thereby regulate the cutting height of stationary blade 22 from the surface of the ground.

All of the foregoing parts are common in lawn mower construction.

Figs. 1 and 2 illustrate a type of reel construction which is particularly adapted for the application of my invention, while Fig. 5 illustrates a suitable mounting construction for securing my invention to reels of lawn mowers already in use. It will be observed in Figs. 1 and 2 that each arm of the spiders 16 is provided with an integrally formed lug 30 to which the weed gathering blades 32, forming the subject-matter of this invention, are attached. These weed gathering blades have certain characteristics to be hereinafter described and are adjustably secured to the lugs 30 by means of bolts 33 passing through the slots 34. This adjustability of the blades 32 enables their extreme outer radial edges to be moved toward or away from the arc in which the cutting edges of the mower blades 17 travel, the intention being to keep the outer edges of the weed gathering blades 32 slightly removed from the arc in which the cutting edges of the mower blades 17 travel, in order not to come into contact with stationary cutter blade 22. The weed gathering blades 32 are formed, in so far as thickness and breadth are concerned, somewhat similar to the blades 17, and the arrangement of the blades 32 on the reel is such that the outer edges of blades 32 stand in planes which are parallel, or approximately so, with the cutting edges of blades 17, it being immaterial whether the cutting edges of blades 17 run parallel with reel shaft 15 or are curved, as generally obtains in lawn mower construction.

As shown in Figs. 3 and 4, the weed gathering devices comprise thin flat steel blades, represented by the numeral 32, which are provided on one edge with a series of integrally formed extensions 40, of which the spear or arrow-head type is the preferred style. When the extensions 40 reach the lowest level in their arc of travel about the reel the weed stalks are gathered into the recesses 41, formed by undercutting extensions 40, and the barbs formed on said extensions through this undercutting reduce the liability of accidental displacement of the weed stalks from said recesses 41. As the weed gathering blades 32 continue through their arc of travel the weed stalks are elevated in advance of the stationary blade 22, and through both the continued movements of the reel and advance travel of the mower over the surface of the ground, the grass cutting blades 17 move the elevated weed stalks against said stationary blade 22 and sever them close to the surface of the ground.

Fig. 2 fully illustrates the action of the parts upon the weed stalks. The different stages of operation of the weed gathering blades 32 upon the weed stalks is so clearly shown in Figs. 1 and 2 that further description is deemed unnecessary.

Fig. 5 illustrates certain means for securing the weed gathering blades 32 to the reels of mowers already in use. This construction contemplates the use of suitable standards 45 which are provided in one end with notches 46 adapted to engage the reel-shaft 15, and said standards are secured to the sides of the spokes of spiders 16 by means of the bolts 47. As the standards 45 are usually composed of strap material the upper ends may be given a twist of ninety degrees so as to present a larger surface for the mounting of blades 32.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

Having thus fully described my said invention, what I desire to secure by Letters Patent, is—

1. The combination, with a lawn mower, of a stationary cutter blade, a rotating reel provided with grass cutting blades, and means carried by said reel for gathering the stalks of weeds and bending them over the cutting edge of the stationary blade and into the path of travel of the cutting edges of the grass cutting blades on the reel.

2. The combination, with a lawn mower, of a stationary cutter blade, a rotating reel provided with grass cutting blades, means carried by said reel for gathering the stalks of weeds and bending them over the cutting edge of the stationary blade and into the path of travel of the cutting edges of the grass cutting blades on the reel, and means for adjusting said grass gathering means to and from the axis of the reel.

3. The combination, with a lawn mower, of a stationary cutter blade, a rotating reel provided with grass cutting blades, and means arranged on said reel and extending in planes approximately parallel with the cutting edges of the grass cutting blades for gathering the stalks of weeds and bending them over the cutting edge of the stationary blade and into the arc of travel of the cutting edges of the grass cutting blades.

4. The combination, with a lawn mower, of a stationary cutter blade, a rotating reel provided with grass cutting blades, means arranged on said reel and provided with a series of extensions for gathering the stalks of weeds and bending them over the cutting edge of the stationary blade and into the path of travel of the cutting edges of the grass cutting blades on the reel.

5. The combination, with a lawn mower, of a stationary cutter blade, a rotating reel provided with grass cutting blades, weed gathering means arranged on said reel consisting of bars provided with undercut extensions for gathering the stalks of weeds and bending them over the cutting edge of the stationary blade and into the path of travel of the cutting edges of the grass cutting blades on the reel.

6. The combination, with a lawn mower, of a stationary cutter blade, a rotating reel provided with grass cutting blades, weed gathering means arranged on said reel consisting of bars provided with undercut extensions for gathering the stalks of weeds and bending them over the cutting edge of the stationary blade and into the path of travel of the cutting edges of the grass cutting blades on the reel, and means for adjusting said bars with their extensions to and from the axis of the reel.

7. The combination, with a lawn mower, of a stationary cutter blade, a rotating reel provided with grass cutting blades, and weed gathering means arranged on said reel consisting of blades provided with undercut extensions providing recesses for temporarily holding the gathered weed stocks, said gathering means bending the stalks of the weeds over the cutting edge of the stationary blade and into the path of travel of the cutting edges of the grass cutting blades on the reel.

8. The combination, with a lawn mower, of a stationary cutting blade, a rotating reel provided with grass cutting blades, and weed gathering means on said reel, said gathering means consisting of bars provided with arrow-head shaped extensions having barbs for temporarily holding the gathered weed stalks and bending them over the cutting edge of the stationary blade and into the path of travel of the cutting edges of the grass cutting blades on the reel.

In witness whereof I have hereunto set my hand and seal at Indianapolis, Indiana, this 14th day of August, A. D. one thousand nine hundred and sixteen.

CHARLES E. PHILLIPS. [L. S.]